United States Patent
Young et al.

(10) Patent No.: US 7,158,852 B2
(45) Date of Patent: Jan. 2, 2007

(54) METHODS FOR CONTROLLING DIMENSIONAL VARIATIONS IN WORKPIECES SUBJECTED TO MACHINING OPERATIONS

(75) Inventors: Keith A. Young, St. Peters, MO (US); Kevin G. Waymack, Hazelwood, MO (US); Ryan L. Hanks, Bunker Hill, IL (US)

(73) Assignee: The Boeing Company, Chicago, IL (US)

( * ) Notice: Subject to any disclaimer, the term of this patent is extended or adjusted under 35 U.S.C. 154(b) by 88 days.

(21) Appl. No.: 11/112,486

(22) Filed: Apr. 22, 2005

(65) Prior Publication Data

US 2006/0241804 A1 Oct. 26, 2006

(51) Int. Cl.
*G06F 19/00* (2006.01)

(52) U.S. Cl. ............... 700/176; 700/193; 356/401; 382/151; 409/182

(58) Field of Classification Search ........ 700/174–176, 700/192, 193; 101/171, 181; 356/401; 382/151, 382/289; 409/182
See application file for complete search history.

(56) References Cited

U.S. PATENT DOCUMENTS

| | | | |
|---|---|---|---|
| 4,445,811 A | 5/1984 | Sanders | |
| 5,020,006 A | 5/1991 | Sporon-Fiedler | |
| 5,148,600 A | 9/1992 | Chen et al. | |
| 5,408,189 A | 4/1995 | Swart et al. | |
| 5,558,557 A * | 9/1996 | Dashevsky | 451/10 |
| 5,727,461 A | 3/1998 | Clayfield et al. | |
| 5,737,441 A | 4/1998 | Nishi | |
| 6,097,495 A | 8/2000 | Uzawa et al. | |
| 6,240,218 B1 | 5/2001 | Michael et al. | |
| 6,333,786 B1 | 12/2001 | Uzawa et al. | |
| 6,591,746 B1 | 7/2003 | Siler | |
| 6,681,145 B1 * | 1/2004 | Greenwood et al. | 700/193 |
| 2001/0001840 A1 * | 5/2001 | Lichtenstein et al. | 700/121 |

* cited by examiner

*Primary Examiner*—Leo Picard
*Assistant Examiner*—Douglas S. Lee
(74) *Attorney, Agent, or Firm*—Lee & Hayes, PLLC

(57) ABSTRACT

The present invention comprises methods of machining a workpiece. In one embodiment, a method includes positioning a workpiece in a first position in a process station of a machine system, and forming at least one check feature on the workpiece. A position of the check feature is then sensed while the workpiece is positioned in the first position, and one or more machined features are formed on the workpiece relative to the check feature while the workpiece is positioned in the first position. The workpiece is then moved from the first position to a second position within the process station, and a position of the check feature is again sensed while the workpiece is positioned in the second position. One or more machined features are then formed on the workpiece relative to the check feature while the workpiece is positioned in the second position.

21 Claims, 4 Drawing Sheets

METHODS FOR CONTROLLING DIMENSIONAL VARIATIONS IN WORKPIECES SUBJECTED TO MACHINING OPERATIONS

FIELD OF THE INVENTION

This invention relates generally to methods for processing workpieces in machining operations, and more specifically, to methods for controlling dimensional variations in workpieces subjected to machining operations.

BACKGROUND OF THE INVENTION

Manufacturing operations often employ machine tool systems to form the various constituent parts in a desired product. Briefly, a machine tool system is operable to process a workpiece that is fixedly retained at a process station within the system according to a predetermined set of instructions. During the processing, a machine tool retained by the system engages the workpiece and removes predetermined amounts of the material from the workpiece. A new surface is thus generated on the workpiece that conforms more closely to the desired final shape of the part. Examples of processes that may be performed by machine tool systems include drilling, reaming, milling planar and/or curved surfaces, and turning a workpiece about a fixed axis, in addition to other known machining operations.

The process station generally includes a workpiece jig that supports the workpiece within the process station so that the workpiece is suitably oriented relative to the one or more machine tools operably controlled by the machine tool system. In many cases, the workpiece jig is configured to support the workpiece in more than one position relative to the machine tools so that a first set of machined features are formed on the workpiece when positioned in a first position, and a second set of machined features are formed when positioned in a second position. Depending upon the complexity of the workpiece, the workpiece jig may include still other additional positions.

With reference now to FIG. 1, a plan view of a workpiece 10 retained in a process station 12 is shown, according to the prior art. The workpiece 10 is positioned on a workpiece jig 14 having a set of dowel pins 16 that are removably received by location holes 18 that project through the workpiece 10. The workpiece 10 faces a machine tool (not shown in FIG. 1) that is configured to form the first set of machined features on the workpiece 10 (also not shown in FIG. 1). The workpiece 10 is then removed from the workpiece jig 14 and rotated about an axis 20 so that an opposing side of the workpiece 10 faces the machine tool when the location holes 18 re-engage the dowel pins 16. A second set of machined features (also not shown in FIG. 1) are then formed on the opposing side of the workpiece 10.

A significant drawback associated the foregoing method is that positional differences between the first set of machined features and the second set of machined features may be introduced into the workpiece 10 due to positional errors present in the workpiece jig 14. As shown in FIG. 1, the positional errors result in shifting the workpiece 10 in a first direction $\Delta x$ and a second direction $\Delta y$ following the rotation of the workpiece 10. Accordingly, the first set of machined features and the second set of machined features in the finished part are correspondingly offset by the positional values $\Delta x$ and $\Delta y$. The positional errors may be introduced, for example, by errors in positioning the dowel pins 16 during fabrication of the jig 14, or they may be introduced as the dowel pins 16 are subjected to wear, or by still other variations in the jig 14. Accordingly, improved methods for controlling dimensional variations introduced into workpieces by dimensional variations in the workpiece jig, or by other means, would have utility.

SUMMARY

The present invention comprises methods of machining a workpiece. In one aspect, a method includes positioning a workpiece in a first position in a process station of a machine system, and forming at least one check feature on a selected portion of the workpiece. A position of the at least one check feature is then sensed while the workpiece is positioned in the first position, and one or more machined features are formed on the workpiece relative to the at least one check feature while the workpiece is positioned in the first position. The workpiece is then moved from the first position to a second position within the process station, and a position of the at least one check feature is again sensed while the workpiece is positioned in the second position. One or more machined features are then formed on the workpiece relative to the at least one check feature while the workpiece is positioned in the second position.

BRIEF DESCRIPTION OF THE DRAWINGS

Various embodiments of the present invention are described in detail below with reference to the following drawings.

DETAILED DESCRIPTION

The present invention relates to methods for controlling dimensional variations in workpieces subjected to machining operations. Many specific details of certain embodiments of the invention are set forth in the following description and in FIGS. 2 through 6 to provide a thorough understanding of such embodiments. One skilled in the art, however, will understand that the present invention may have additional embodiments, or that the present invention may be practiced without several of the details described in the following description.

Figure 1:
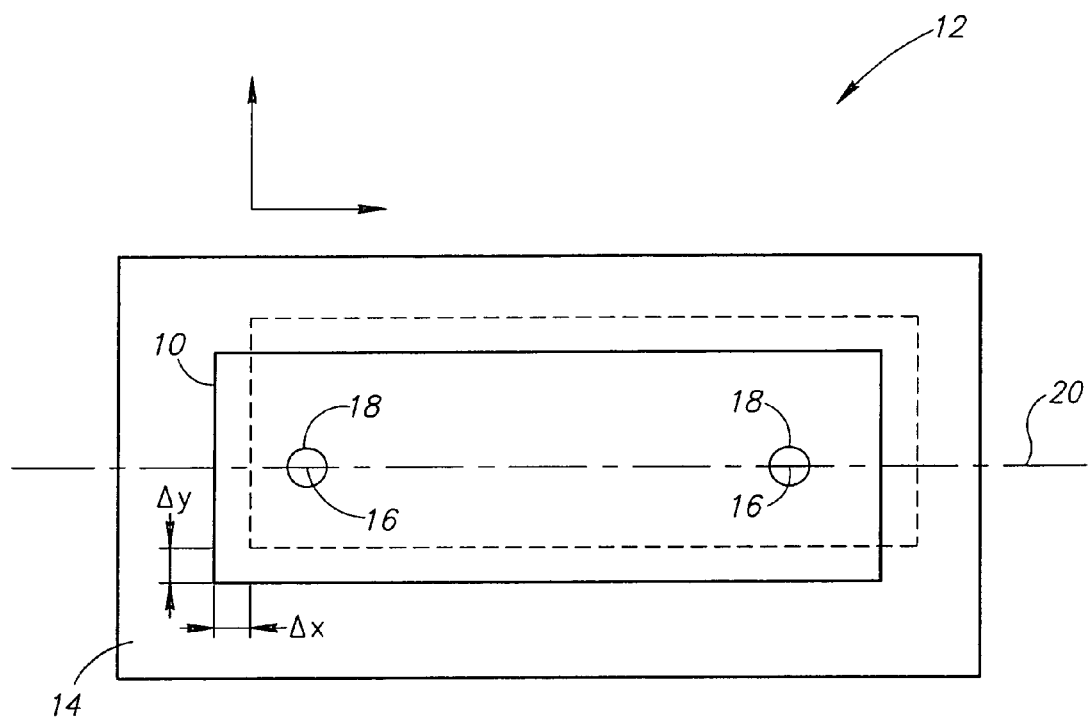
FIG. 1 is a plan view of a workpiece retained in a process station of a machine system according to the prior art.
Figure 2:
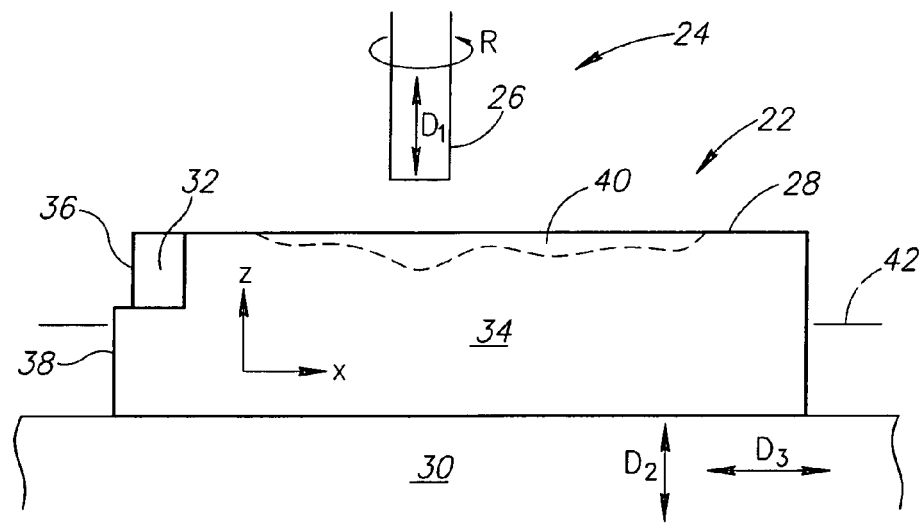
FIG. 2 is a partial side elevation view of a process station of a machine system that is used to describe a method of controlling dimensional variations in processing a workpiece, according to an embodiment of the invention.

FIG. 2 is a partial side elevation view of a process station 22 of a machine system 24 that will be used to describe a method of controlling dimensional variations in processing a workpiece, according to an embodiment of the invention. The machine system 24 includes one or more machine tools 26 that are generally configured to form machined features in a workpiece 28. Accordingly, the one or more machine tools 26 may be moved in a direction $D_1$ and/or in a rotational direction R relative to the workpiece 28. The one or more machine tools 26 may include, for example, reamers, drills, end mills or other similar tools. The process station 22 also includes a workpiece jig 30 that supports the workpiece 28, which is coupled to the machine system 24. The workpiece jig 30 includes one or more locating features that permit the workpiece 28 to be positioned on the workpiece jig 30 in a first position. The locating features may include, for example, dowel pins, clamping fixtures and abutments, although other locating features are known in the art. The machine system 24 is further operable to move the workpiece jig 30 in the mutually perpendicular directions $D_2$ and $D_3$, as shown and may further move the jig 30 in a direction $D_4$ (not shown in FIG. 2) that is perpendicular to the directions $D_2$ and $D_3$.

The method of controlling dimensional variations in processing a workpiece will now be described. Still referring to FIG. 2, a first check feature 32 is formed on a first face 34 of the workpiece 28, and a second check feature 36 is formed on a second face 38 of the workpiece 28. The first check feature 32 and the second check feature 36 may be formed on the respective surfaces 34 and 38 by a selected one of the machine tools 26 of the machine system 24. For example, the selected one of the machine tools 26 may be an end mill that is appropriate to form planar lands on the workpiece 28 that form the respective first and second check features 32 and 36.

Although the first check feature 32 and the second check feature 36 as shown in FIG. 2 are formed at a corner location of the workpiece 28, it is understood that the first check feature 32 and the second check feature 36 may be positioned on other portions of the first face 34 and the second face 38, respectively. Additionally, the check features 32 and 36 may be formed on a marginal portion of the workpiece 28 that may be removed by machining when the machining operations on the workpiece 28 are substantially complete. Furthermore, while FIG. 2 shows a first and second check features 32 and 36 formed on the workpiece 28, it is understood that other check features may be formed on other surfaces of the workpiece 28 to control the formation of other features. For example, a third check feature (not shown in FIG. 2) may be formed on the workpiece 28 on a third surface that is approximately perpendicular to the $D_2$ direction (or z-direction). Moreover, it is also understood that check features may be formed on the workpiece 28 to control one or more angular positions of the workpiece 28.

Figure 3:
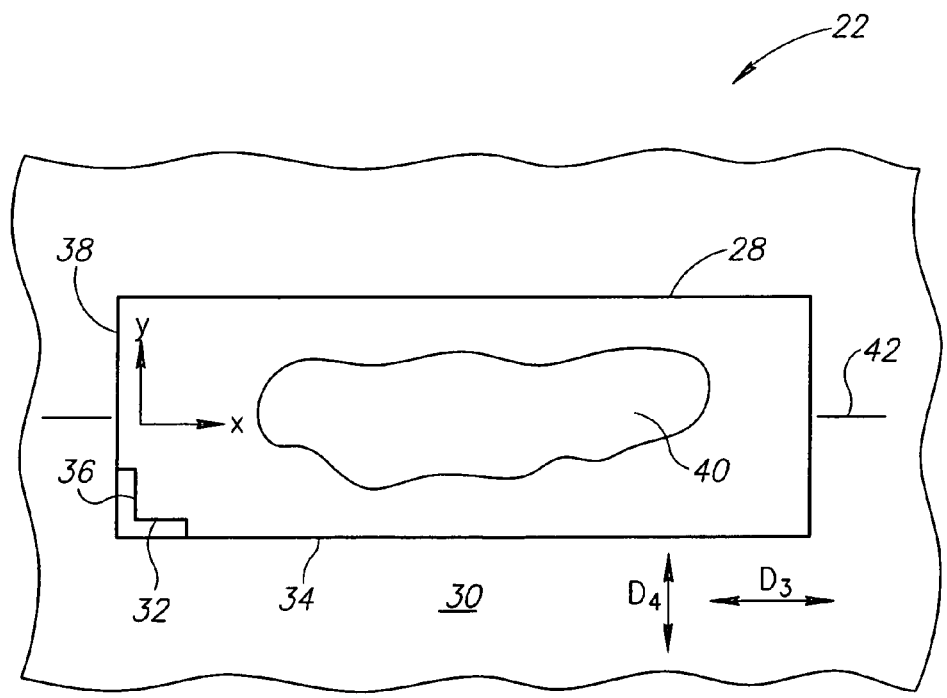
FIG. 3 is a partial plan view of the process station of the machine system of FIG. 1.

With reference now also to FIG. 3, which is a partial plan view of the process station 22 of FIG. 2, the position of the first check feature 32 and the second check feature 36 may be sensed to determine the position of the first and second check features 32 and 36. Accordingly, the machine system 24 may utilize mechanical surface contact probes to determine first probed positions of the first and second check features 32 and 36. A suitable surface contact probe is the Renishaw TP-20 probe, available from Renishaw Ltd. of Gloucestershire UK, although other alternatives exist. Alternately, non-contacting probes that are operable to sense the first and second check features 32 and 36 by optical or acoustic means may also be used. In either case, the first probed positions of the first and second check a memory device coupled to the machine system 24 may store features 32 and 36. Subsequently, a first set of machined features 40 is formed in the workpiece 28 relative to the first probed positions. The workpiece 28 may then be positioned in a second position relative to the workpiece jig 30 by removing the workpiece 28 from the jig 30 and repositioning the workpiece on the jig 30. In the present example, the workpiece 28 is rotated about an axis 42 so that an opposing portion of the workpiece 28 may be engaged by the machine tools 26 of the system 24.

Figure 4:
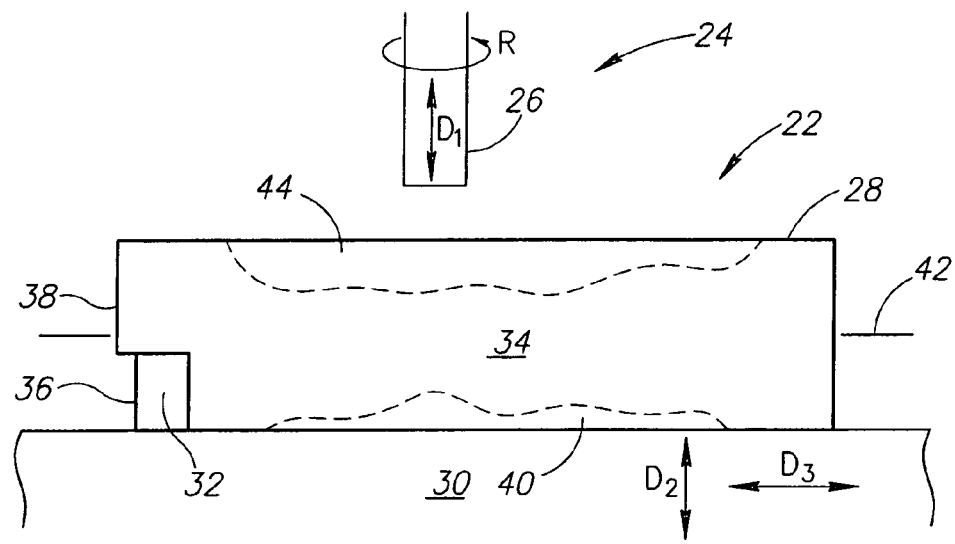
FIG. 4 is a partial side elevation view of the process station with the workpiece positioned in the second position.
Figure 5:
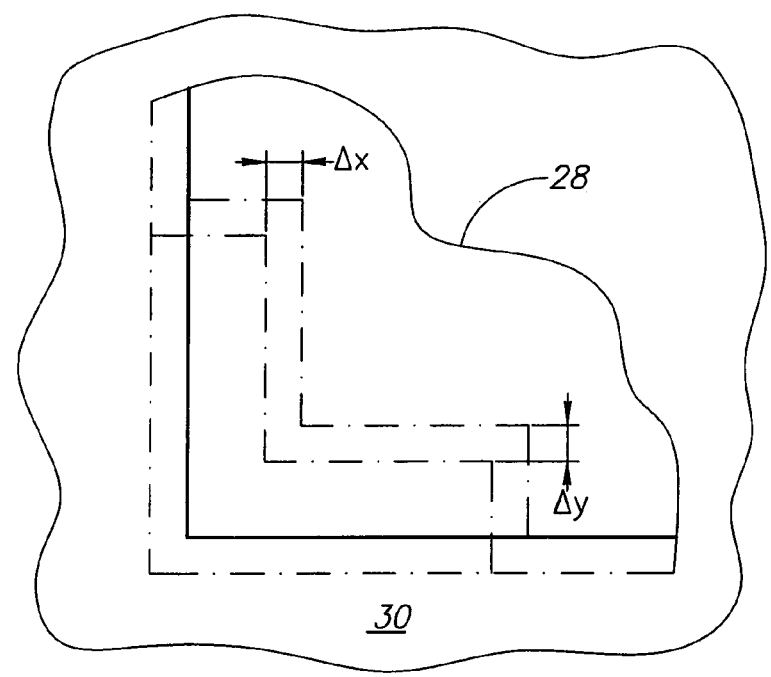
FIG. 5 is an enlarged partial plan view of the first and second check features of the workpiece.

Referring now to FIG. 4, a partial side elevation view of the process station 22 is shown, with the workpiece 28 positioned in the second position. Repositioning the workpiece 28 generally offsets the first check feature 32 and/or the second check feature 36 relative to the initial positions of the first and second check features 32 and 36 when the workpiece 28 was positioned in the first position. In order to determine the magnitude of the offset, the positions of the first check feature 32 and the second check features 36 are again located using mechanical surface contact probes, or non-contacting probes to determine second probed positions of the first and second check features 32 and 36. With reference now also to FIG. 5, which shows an enlarged partial plan view of the first and second check features 32 and 36 of the workpiece 28, the offset values $\Delta x$ and $\Delta y$ may be obtained by subtracting the first probed positions from the second probed positions.

Figure 6:
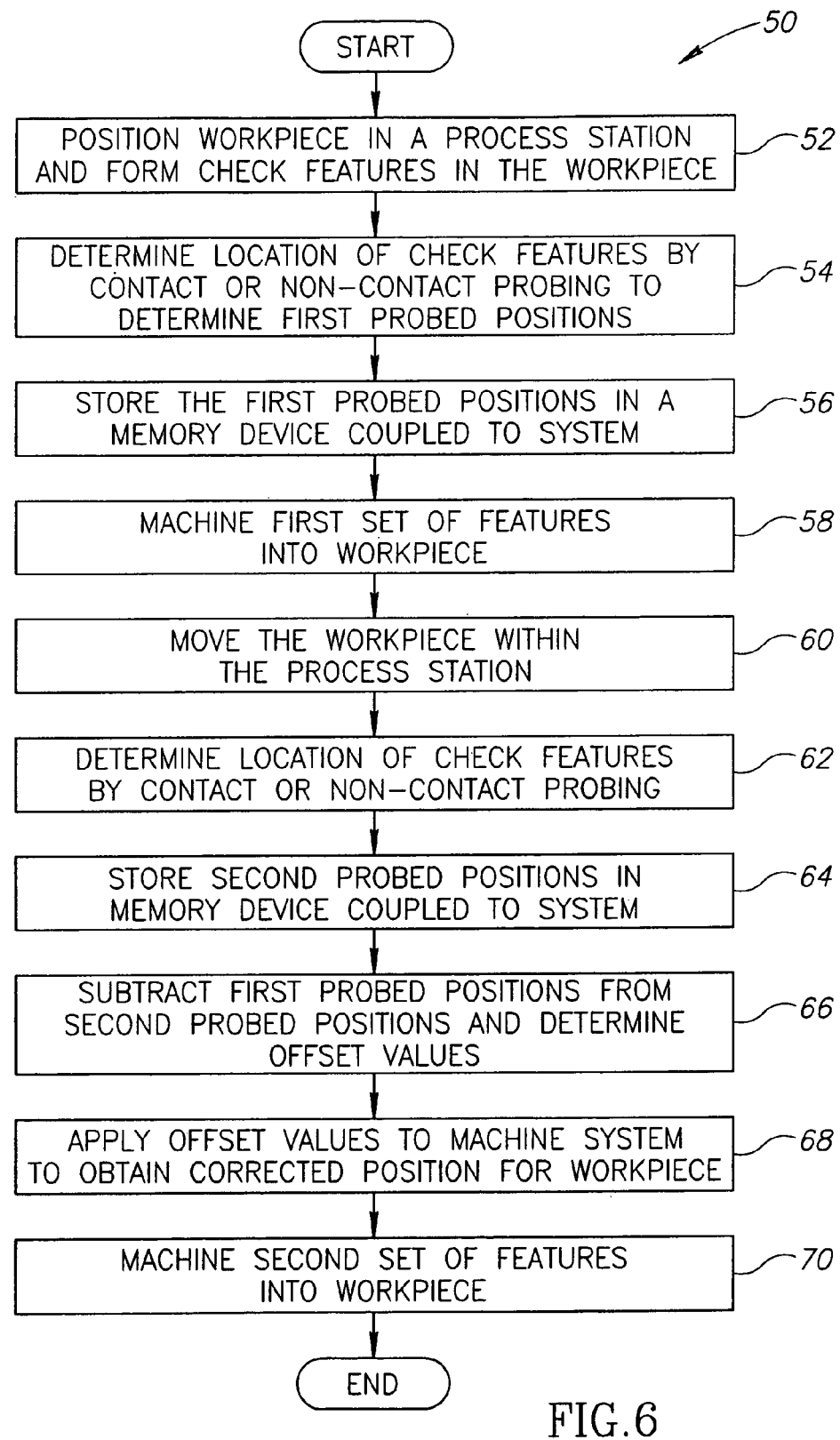
FIG. 6 is a flowchart that describes a method of controlling dimensional variations in a workpiece, according to another embodiment of the invention.

FIG. 6 is a flowchart that will be used to describe a method 50 of controlling dimensional variations in a workpiece, according to another embodiment of the invention. With continued reference also to FIGS. 2 through 5, at block 52 the workpiece 28 is positioned in the process station 22 of the machine tool system 24 in a first position. The workpiece 28 may be positioned on the jig 30 when the workpiece 28 is positioned in the process station 22. Accordingly, the workpiece 28 may be positioned on the jig 30 by engaging locating structures such as dowel pins, abutments, clamps, or other like structures coupled to the workpiece jig 30. One or more check features are then formed in the workpiece 28 by machining the check features into the workpiece 28. At block 54, the location of the check features is determined by contacting the check features with a suitable surface contact probe to determine one or more first probed positions. Alternately, the location of the check features may be determined using a non-contacting surface probe or method. At block 56, the first probed positions are stored in a memory device that is coupled to the machine tool system 24. At block 58, a first set of machined features 40 are formed in the workpiece 28 by engaging the machine tool 26 with the workpiece 28 and forming the features in accordance with a predetermined set of instructions.

Still referring to FIG. 6, at block 60, the workpiece 28 is moved to a second position within the process station 22 of the machine tool system 24. Accordingly, the workpiece 28 is removed from the workpiece jig 30 and repositioned on the jig 30 by engaging the locating structures coupled to the jig 30. The location of the check features formed in the workpiece 28 is again determined by probing the check features with a suitable contact or non-contact probe, as shown at block 62. At block 64, the second probed positions are stored in the system 24. At block 66, the first probed positions are subtracted from the second probed positions to determine offset values that may be used to effect positional corrections to the workpiece 28. At block 68, the position of the workpiece 28 may be corrected by translating the jig 30 in one or more predetermined directions (i.e. "indexing" the workpiece 28). Alternately, the positional corrections may be implemented by applying the positional corrections to coordinate positions of the machine tools 26 of the machine system 24. At block 70, the second set of machined features 44 is formed is the workpiece 28. When substantially all of the machined features are formed on the workpiece 28, the check features on the workpiece 28 may be removed by machining the marginal portion of the workpiece 28 where the check features are formed.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A method of machining a workpiece, comprising:
    positioning a workpiece in a first position in a process station of a machine system;
    forming at least one check feature on a selected portion of the workpiece;
    sensing a position of the at least one check feature while the workpiece is positioned in the first position;
    forming one or more machined features on the workpiece relative to the at least one check feature while the workpiece is positioned in the first position;
    moving the workpiece from the first position to a second position within the process station;
    sensing a position of the at least one check feature while the workpiece is positioned in the second position; and
    forming one or more machined features on the workpiece relative to the at least one check feature while the workpiece is positioned in the second position.

2. The method of claim 1, wherein positioning a workpiece in a first position in a process station of a machine system further comprises coupling the workpiece to a workpiece jig positioned within the process station.

3. The method of claim 2, wherein coupling the workpiece to a workpiece jig positioned within the process station further comprises engaging the workpiece with one or more locating features on the workpiece jig.

4. The method of claim 1, wherein forming at least one check feature on a selected portion of the workpiece further comprises engaging at least one machine tool coupled to the machine system with the workpiece to form the at least one check feature.

5. The method of claim 4, wherein engaging at least one machine tool coupled to the machine system with the workpiece further comprises forming the check feature on a selected surface of the workpiece by milling a fiducial surface feature onto the workpiece.

6. The method of claim 1, wherein sensing a position of the at least one check feature further comprises:
    moving a surface contact probe towards the check feature;
    contacting the check feature with the surface contact probe to determine a location of the check feature; and
    storing the location of the check feature in a memory device coupled to the machine system.

7. The method of claim 1, wherein sensing a position of the at least one check feature further comprises:
    determining a location of the check feature with a non-contacting probe; and
    storing the location of the check feature in a memory device coupled to the machine system.

8. The method of claim 1, wherein forming one or more machined features on the workpiece relative to the at least one check feature further comprises engaging one or more machine tools of the machine system with the workpiece.

9. A method of controlling a dimensional feature in a machining operation, comprising:
    positioning a workpiece in a first position in a process station of a machine system, the workpiece including at least a first and a second exposed surface;
    imparting a first check feature on the first surface and a second check feature on the second surface of the workpiece;
    while the workpiece is positioned in the first position, sensing a position of the first check feature and the second check feature and forming a first set of machined features in the workpiece relative to the sensed positions;
    moving the workpiece from the first position to a second position within the process station; and
    while the workpiece is positioned in the second position, sensing a position of the first check feature and the second check feature and forming a second set of machined features in the workpiece relative to the sensed positions.

10. The method of claim 9, wherein positioning a workpiece in a first position in a process station of a machine system further comprises coupling the workpiece to a workpiece jig positioned within the process station.

11. The method of claim 10, wherein coupling the workpiece to a workpiece jig positioned within the process station further comprises engaging the workpiece with one or more locating features on the workpiece jig.

12. The method of claim 9, wherein imparting a first check feature on the first surface and a second check feature on the second surface of the workpiece further comprises engaging at least one machine tool coupled to the machine system with the workpiece to form the first check feature and the second check feature.

13. The method of claim 9, wherein sensing a position of the first check feature and the second check feature further comprises:
    positioning a surface contact probe against the first check feature and the second check feature;
    determining respective locations of the first check feature and the second check feature; and
    storing the location of the first check feature and the second check feature in a memory device coupled to the machine system.

14. The method of claim 9, wherein sensing a position of the first check feature and the second check feature further comprises:
    determining respective locations of the first check feature and the second check feature with a non-contacting probe; and
    storing the location of the first check feature and the second check feature in a memory device coupled to the machine system.

15. The method of claim 9, wherein forming a first set of machined features and forming a second set of machined features further comprises forming the first set of machined features and the second set of machined features by engaging one or more machine tools of the machine system with the workpiece.

16. The method of claim 9, further comprising a third exposed surface on the workpiece and imparting a third check feature on the third surface.

17. The method of claim 16, wherein sensing a position of the first check feature and the second check feature further comprises sensing a position of the third check feature.

18. A method of controlling dimensional variations in a workpiece, comprising:
    positioning a workpiece in a first location in a process station of a machine system and forming check features on selected portions of the workpiece;

determining first respective locations of the check features and storing the determined locations in a memory portion of the machine system;

forming a first portion of the machined features in the workpiece relative to the determined locations;

moving the workpiece from the first location to a second location within the process station;

determining second respective locations of the check features when the workpiece is in the second location and subtracting the first respective positions from the second respective locations to generate at least one offset value; and applying the at least one offset value while forming a second portion of the machined features in the workpiece.

19. The method of claim 18, wherein applying the at least one offset value further comprises indexing the workpiece within the process station.

20. The method of claim 18, wherein determining first and second respective locations of the check features further comprises probing the first and second respective locations with at least one surface contact probe.

21. The method of claim 18, wherein determining first and second respective locations of the check features further comprises probing the first and second respective locations with at least one non-contact probe.

* * * * *